United States Patent
Kondo et al.

(10) Patent No.: US 10,703,860 B2
(45) Date of Patent: Jul. 7, 2020

(54) INSULATING COATING MATERIAL HAVING EXCELLENT WEAR RESISTANCE

(71) Applicant: KANEKA CORPORATION, Osaka-shi (JP)

(72) Inventors: Yasutaka Kondo, Otsu (JP); Makoto Tawada, Otsu (JP); Kazuhiro Ono, Otsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/606,433

(22) Filed: May 26, 2017

(65) Prior Publication Data

US 2017/0260331 A1   Sep. 14, 2017

Related U.S. Application Data

(63) Continuation of application No. PCT/JP2015/082305, filed on Nov. 17, 2015.

(30) Foreign Application Priority Data

Nov. 27, 2014   (JP) ................... 2014-240251

(51) Int. Cl.
*H01B 7/02* (2006.01)
*H01B 3/44* (2006.01)
(Continued)

(52) U.S. Cl.
CPC ........ *C08G 73/1067* (2013.01); *B32B 15/082* (2013.01); *B32B 15/085* (2013.01);
(Continued)

(58) Field of Classification Search
CPC ... B32B 27/28; B32B 27/281; B32B 2379/08; B32B 15/00; B32B 15/04; B32B 15/08;
(Continued)

(56) References Cited

U.S. PATENT DOCUMENTS 4,801,506 A   1/1989   Motonari et al.
5,006,411 A   4/1991   Motonari et al.
(Continued)

FOREIGN PATENT DOCUMENTS

CN   101939796 A   1/2011
CN   102575034 A   7/2012
(Continued)

OTHER PUBLICATIONS

Furrer, D.U. Semiatin, S.L.. (2009). ASM Handbook, vol. 22A—Fundamentals of Modeling for Metals Processing—49. Density of Metals and Alloys. ASM International. Retrieved from app.knovel.conn/hotlink/pdf/id:kt007PH7H7/asm-handbook-volume-22a/density-metals-alloys (Year: 2009).*
(Continued)

*Primary Examiner* — Maria V Ewald
*Assistant Examiner* — Ethan A. Utt
(74) *Attorney, Agent, or Firm* — Oblon, McClelland, Maier & Neustadt, L.L.P.

(57) ABSTRACT

An insulating coating material including a polyimide film, and an adhesion layer on at least one side of a polyimide film. The polyimide film has a weight of 23.5 g or less per 1 $m^2$ and a loop stiffness value of 0.45 g/cm or more.

13 Claims, 1 Drawing Sheet

(51) Int. Cl.
| | |
|---|---|
| *C09J 7/25* | (2018.01) |
| *B32B 27/32* | (2006.01) |
| *B32B 27/08* | (2006.01) |
| *B32B 27/28* | (2006.01) |
| *H01B 17/56* | (2006.01) |
| *H01B 3/30* | (2006.01) |
| *C08G 73/10* | (2006.01) |
| *C08J 5/18* | (2006.01) |
| *B32B 15/18* | (2006.01) |
| *B32B 15/085* | (2006.01) |
| *B32B 27/30* | (2006.01) |
| *B32B 15/20* | (2006.01) |
| *B32B 15/082* | (2006.01) |
| *B32B 27/34* | (2006.01) |

(52) U.S. Cl.
CPC .............. *B32B 15/18* (2013.01); *B32B 15/20* (2013.01); *B32B 27/08* (2013.01); *B32B 27/281* (2013.01); *B32B 27/30* (2013.01); *B32B 27/32* (2013.01); *B32B 27/322* (2013.01); *B32B 27/34* (2013.01); *C08G 73/10* (2013.01); *C08G 73/1007* (2013.01); *C08J 5/18* (2013.01); *C09J 7/25* (2018.01); *H01B 3/306* (2013.01); *H01B 3/445* (2013.01); *H01B 7/02* (2013.01); *H01B 17/56* (2013.01); *B32B 2255/10* (2013.01); *B32B 2255/26* (2013.01); *B32B 2307/206* (2013.01); *B32B 2307/308* (2013.01); *B32B 2307/554* (2013.01); *B32B 2307/581* (2013.01); *B32B 2307/718* (2013.01); *B32B 2605/18* (2013.01); *C08J 2379/08* (2013.01); *C09J 2203/302* (2013.01); *C09J 2427/00* (2013.01); *C09J 2479/086* (2013.01)

(58) Field of Classification Search
CPC ......... B32B 15/18; B32B 15/20; B32B 27/00; B32B 27/06; B32B 27/08; B32B 27/30; B32B 27/304; B32B 27/32; B32B 27/322; B32B 2327/00; B32B 2327/12; B32B 2327/18; B32B 2379/00; Y10T 428/31721; Y10T 428/3154; Y10T 428/31544; Y10T 428/31855; Y10T 428/31935; Y10T 428/31678; Y10T 428/31681; Y10T 428/24942; Y10T 428/2495; Y10T 428/24959; Y10T 428/24967; Y10T 428/24975; Y10T 428/24983; Y10T 428/24992; Y10T 428/26; Y10T 428/263; Y10T 428/264; Y10T 428/265; Y10T 428/266; Y10T 428/268; Y10T 428/269; Y10T 428/27; Y10T 428/273; Y10T 428/28; Y10T 428/2804; Y10T 428/2848; Y10T 428/2852; Y10T 428/2878; C08G 73/10; C08G 73/1007; C08G 73/1042; C08G 73/1067; C08G 73/1075; C08G 73/1078; C08G 73/1082; C08G 73/1085; C08G 73/101; C08G 73/1014; C08G 73/1017; C08G 73/1021; C08G 73/1028; C08G 73/1032; C08G 73/1003; H01B 3/30; H01B 3/306; H01B 3/00; H01B 3/18; H01B 3/303; H01B 3/307; H01B 3/308; H01B 3/44; H01B 3/443; H01B 3/445; C09J 7/00; C09J 7/20; C09J 7/22; C09J 7/25; C09J 7/29; C09J 7/30; C09J 127/00; C09J 127/02; C09J 127/12; C09J 127/14; C09J 127/16; C09J 127/18; C09J 127/20

USPC .... 428/473.5, 421, 422, 500, 522, 457, 458, 428/212–220, 332, 334–341, 343, 344, 428/354, 355 R, 355 EN; 528/271, 332, 528/335, 338, 339, 354, 363, 340, 342, 528/347, 348, 350–353; 174/68.1, 110, 174/110 R, 110 SR, 120, 120 R, 120 SR, 174/121 R, 121 SR, 120 C, 110 FC

See application file for complete search history.

(56) References Cited

U.S. PATENT DOCUMENTS

| | | | |
|---|---|---|---|
| 5,731,088 | A | 3/1998 | La Court |
| 5,859,171 | A | 1/1999 | Sawasaki et al. |
| 6,127,509 | A | 10/2000 | Pratte et al. |
| 7,018,704 | B2 | 3/2006 | Kaneshiro et al. |
| 7,022,402 | B2 | 4/2006 | Lacourt |
| 2003/0062190 | A1 | 4/2003 | Kim et al. |
| 2004/0081808 | A1 | 4/2004 | Kaneshiro et al. |
| 2005/0013998 | A1 | 1/2005 | Lacourt |
| 2007/0009751 | A1 | 1/2007 | Hwang et al. |
| 2009/0297858 | A1 | 12/2009 | Glenn et al. |
| 2010/0209681 | A1 | 8/2010 | Lee et al. |
| 2010/0282488 | A1* | 11/2010 | Zheng .................... H01B 3/306 428/213 |
| 2012/0222884 | A1 | 9/2012 | Honda et al. |
| 2012/0227790 | A1 | 9/2012 | Auman et al. |
| 2012/0228616 | A1 | 9/2012 | Auman et al. |
| 2012/0231257 | A1 | 9/2012 | Dunbar et al. |
| 2012/0231263 | A1 | 9/2012 | Auman et al. |
| 2012/0231264 | A1 | 9/2012 | Auman et al. |
| 2012/0292086 | A1 | 11/2012 | Auman et al. |
| 2013/0233590 | A1 | 9/2013 | Shanai et al. |
| 2014/0102752 | A1 | 4/2014 | Ushiwata et al. |
| 2016/0075916 | A1* | 3/2016 | Kondo .................. B32B 27/281 428/220 |

FOREIGN PATENT DOCUMENTS

| | | |
|---|---|---|
| CN | 102791769 A | 11/2012 |
| CN | 103302936 A | 9/2013 |
| EP | 0 811 483 A1 | 12/1997 |
| EP | 1 498 909 A1 | 1/2005 |
| EP | 2 503 558 A1 | 9/2012 |
| JP | 62-162542 A | 7/1987 |
| JP | 62-162543 A | 7/1987 |
| JP | 2-103804 A | 4/1990 |
| JP | 4-303649 A | 10/1992 |
| JP | 4-303652 A | 10/1992 |
| JP | 7-37439 A | 2/1995 |
| JP | 10-100340 A | 4/1998 |
| JP | 11-58543 A | 3/1999 |
| JP | 2001-508588 A | 6/2001 |
| JP | 2004-216830 | 8/2004 |
| JP | 2004-533092 A | 10/2004 |
| JP | 2005-35300 A | 2/2005 |
| JP | 2007-30501 A | 2/2007 |
| JP | 2007-77231 A | 3/2007 |
| JP | 2008-016603 A | 1/2008 |
| JP | 2008-28488 A | 2/2008 |
| JP | 2009-518500 A | 5/2009 |
| JP | 2012-195290 A | 10/2012 |
| JP | 2013-30421 A | 2/2013 |
| JP | 2013-51030 A | 3/2013 |
| JP | 2013-512535 A | 4/2013 |
| JP | 2013-89585 A | 5/2013 |
| JP | 2014-82083 A | 5/2014 |
| JP | 2014-102946 A | 6/2014 |
| JP | 2014-111788 A | 6/2014 |
| JP | 2014-241201 A | 12/2014 |
| WO | WO 98/31022 A1 | 7/1998 |
| WO | WO 2009/032290 A1 | 3/2009 |

(56) References Cited

FOREIGN PATENT DOCUMENTS

WO    WO 2014/192733 A1    12/2014
WO    WO-2014192733 A1 *   12/2014    ............ B32B 27/281

OTHER PUBLICATIONS

Office Action dated Oct. 30, 2017 in co-pending U.S. Appl. No. 14/954,305, 26 pages.
"Upilex-S Technical Data Sheet" UBE Europe GmbH Performance Materials Department, 2005, 8 Pages.
P. M. Hergenrother, et al., "Polyimides from 2,3,3',4'-Biphenyltetracarboxylic Dianhydride and Aromatic Diamines" Polymer, vol. 43, 2002, pp. 5077-5093.
Partial Supplementary European Search Report dated Jan. 5, 2017 in Patent Application No. 14804934.9.
Combined Office Action and Search Report dated Nov. 4, 2016 in Chinese Patent Application No. 201480030510.1 (with English translation).
International Preliminary Report on Patentability and Written Opinion dated Dec. 10, 2015 in PCT/JP2014/063944 (with English translation of Written Opinion).
International Search Report dated Aug. 19, 2014 in PCT/JP2014/063944.
International Search Report dated Feb. 23, 2016 in PCT/JP2015/082304 (with English translation).
International Preliminary Report on Patentability and Written Opinion dated Jun. 8, 2017 in PCT/JP2015/082304 (with English translation of Written Opinion).
International Search Report dated Feb. 16, 2016 in PCT/JP2015/082305 (with English translation).
International Preliminary Report on Patentability and Written Opinion dated Jun. 8, 2017 in PCT/JP2015/082305.
Non-Final Office Action dated Nov. 2, 2018, in U.S. Appl. No. 14/954,305.
Non-Final Office Action dated Nov. 16, 2018 in U.S. Appl. No. 15/606,508.
Inoue et al, "Properties of Copolyimides Prepared from Different Tetracarboxylic Dianhydrydes and Diamines", 1996 *J. Appl. Polym. Sci.*, vol. 62, pp. 2303-2310.
Extended European Search Report dated Jul. 2, 2018 in Patent Application No. 15862218.3, 6 pages.
Office Action dated Jul. 5, 2018 in co-pending U.S. Appl. No. 14/954,305, 11 pages.
"Cables, electrical, aircraft use—Test Methods: Part 503: Scrape abrasion", British Standard Aerospace Series, BS EN 3475-503: 2002, 7 pages.
Combined Office Action and Search Report dated Sep. 28, 2018 in Chinese Patent Application No. 201580064185.5, 15 pages (with English translation).
Final Office Action dated May 16, 2019, in U.S. Appl. No. 14/954,305 (16 pages).
Final Office Action dated Jun. 11, 2019, in U.S. Appl. No. 15/606,508 (13 pages).
Japanese Office Action dated Feb. 25, 2020 in Japanese Patent Application No. 2016-561515 (with English translation), 6 pages.
Chinese Office Action dated Apr. 1, 2020, in Chinese Patent Application No. 201810017933.X (with English Translation).
"Friction and wear of polyimide thin films", M.R. Chitsaz-Zadeh et al., Wear, vol. 110, Issue. 3-4th, p. 359-368, Feb. 20, 2003.

* cited by examiner

INSULATING COATING MATERIAL HAVING EXCELLENT WEAR RESISTANCE

CROSS-REFERENCE TO RELATED APPLICATIONS

The present application is continuation of and claims the benefit of priority to International Application No. PCT/JP2015/082305, filed Nov. 17, 2015, which is based upon and claims the benefit of priority to Japanese Patent Application No. 2014-240251, filed Nov. 27, 2014. The entire contents of these applications are incorporated herein by reference.

BACKGROUND OF THE INVENTION

Field of the Invention

The present invention relates to an insulating coating material and its use, in particular, relates to an insulating coating material that is lightweight and has excellent abrasion resistance and that is used for electric wires and cables and the like for aerospace applications.

Description of Background Art

For an insulating material for electric wires and cables for aerospace applications, in addition to heat resistance, electrical insulation, chemical resistance and flame resistance, durability characteristics such as abrasion resistance and cut through resistance (cut resistance) are demanded.

For example, as materials for electric wires and the like for aerospace applications, multilayer polyimide-fluoropolymer insulating structures and insulated wires and cables and the like, having excellent cut resistance, have been developed (for example, see Patent Documents 1-3).

Patent Document 1 is mainly intended to improve dynamic cut resistance (cut through resistance). There is no description of specific evaluation of abrasion resistance in Patent Document 1. Further, as insulating films used in an insulating coating material, specifically, a polyimide copolymer base layer of polyimide that is derived from pyromellitic acid dianhydride and 4,4'-diaminodiphenyl ether and has a thickness of 2 mils or 2 mil, a polyimide copolymer base layer that is derived from 40 mol % of 3,3',4,4'-biphenyltetracarboxylic acid dianhydride, 60 mol % of pyromellitic acid dianhydride, 60 mol % of p-phenylenediamine, and 40 mol % of 4,4'diaminodiphenyl ether and has a thickness of 0.5 mils, and a polyimide copolymer base layer that is derived from 100 mol % of pyromellitic acid dianhydride, 60 mol % of p-phenylenediamine and 40 mol % of 4,4'diaminodiphenyl ether and has a thickness of 0.75 mils are disclosed.

Patent Document 2 is mainly intended to improve heat seal strength. There is no description of specific evaluation of abrasion resistance in Patent Document 2. Further, an Apical AV is used as an insulating film that is used for an insulating coating material.

Patent Document 3 is intended to also improve abrasion resistance. However, Patent Document 3 discloses that, when a relatively thin polyimide film having a thickness of 0.65 mils is used, the best abrasion resistance is 111 times.

Patent Document 4 is intended to improve thermal dimensional stability and sliding flexibility, which are characteristics that are required for a polyimide film used in a flexible printed circuit board, and focuses on applications and characteristics different from those of an insulating coating material for electric wires and cables, and s structure is also different.

Currently, as insulating coating materials that can be used, an Oasis manufactured by DuPont and an Apical (Type AF) manufactured by Kaneka North America are known.

Patent Document 1: Japanese Patent Laid-Open Publication No. Hei 10-100340 (published on Apr. 21, 1998).
Patent Document 2; U.S. Patent Application Publication No. 2010/0282488.
Patent Document 3: U.S. Pat. No. 7,022,402.
Patent Document 4: U.S. Pat. No. 7,018,704.

SUMMARY OF THE INVENTION

According to an aspect of the present invention, an insulating coating material includes a polyimide film, and an adhesion layer on at least one side of a polyimide film. The polyimide film has a weight of 23.5 g or less per 1 $m^2$ and a loop stiffness value of 0.45 g/cm or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
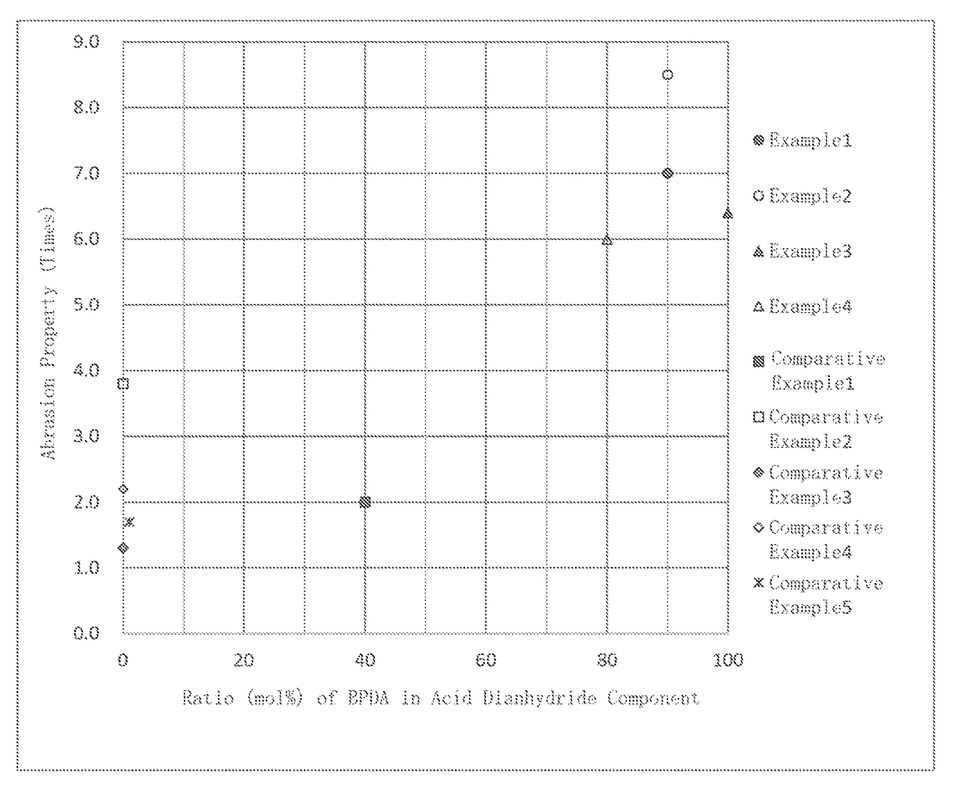
FIG. 1 illustrates relationship between abrasion properties of insulating coating materials according to Examples of the present invention and ratios of 3,3',4,4'-biphenyl-tetracarboxylic acid dianhydride (BPDA) in an acid dianhydride component.

The embodiments will now be described with reference to the accompanying drawings, wherein like reference numerals designate corresponding or identical elements throughout the various drawings.

An embodiment of the present invention is described in detail in the following. All of academic literature and patent documents described in the present specification are incorporated by reference in the present specification.

An insulating coating material according to an embodiment of the present invention includes a polyimide film and an adhesion layer. The polyimide film has a weight of 23.5 g or less per 1 $m^2$ and a loop stiffness value of 0.45 g/cm or more. Further, an insulating coating material according to an embodiment of the present invention includes a polyimide film and an adhesion layer. The polyimide film has a weight of 23.5 g or less per 1 $m^2$ and a loop stiffness value of 0.45 g/cm or more, and is obtained by polymerizing an acid dianhydride component and a diamine component, the acid dianhydride component containing a component (a): 80 mol %-100 mol % of 2,2',3,3'-biphenyl-tetracarboxylic acid dianhydride and/or 3,3',4,4'-biphenyl-tetracarboxylic acid dianhydride in the entire acid dianhydride component, and a component (b): 0 mol %-20 mol % of other acid dianhydride components, and the diamine component containing 90 mol % or more of p-phenylenediamine in the entire diamine component. By preparing an insulating coating material by combining an insulating film having such characteristics with an adhesion layer (to be described later), preferably an adhesion layer containing a fluorine resin, abrasion resistance of an insulated wire obtained by winding the insulating coating material on a conducting wire or the like is significantly improved.

In the following, the insulating film, the adhesion layer, and manufacture of the insulating coating material are described in this order.

<1. Insulating Film>

The insulating film used for the insulating coating material according to an embodiment of the present invention has a weight of 23.5 g or less per 1 $m^2$. The weight is preferably 22.5 g or less per 1 $m^2$, and particularly preferably 21.7 g or less per 1 $m^2$.

When an insulating film having a weight of 23.5 g per 1 $m^2$ is used, weight reduction of about 27% is expected for an insulating coating material with respect to an insulating coating material Apical Type AF (120AF616) manufactured by Kaneka North America; when an insulating film having a weight of 22.5 g per 1 $m^2$ is used, weight reduction of about 29% is expected for an insulating coating material; and when an insulating film having a weight of 21.7 g per 1 $m^2$ is used, weight reduction of about 31% is expected for an insulating coating material. Therefore, considering that the aircraft industry is attempting to reduce material weight by even 1%, the value of using such an insulating film is high. In conventionally known insulating coating materials, even when the weight of an insulating film per unit area is reduced to 23.5 g or less by only reducing the thickness of the insulating film, mechanical properties including abrasion resistance are greatly degraded. This is because thickness dependence of the abrasion resistance is large.

The present inventors prepared various polyimide films including polyimide films that have been conventionally used in insulating materials for coating electric wires and polyimide films disclosed in the prior art in this technical field, and examined influence of composition and characteristics of an insulating film on abrasion resistance and weight per unit area. As a result, the present inventors found that, as will be described later, by combining a specific composition of polyimide and loop stiffness of a film, weight per unit area of a polyimide film can be reduced, and an insulating coating material having excellent abrasion resistance can be provided even when the weight per unit area of the polyimide film is 23.5 g or less. A lower limit for the weight per unit area (weight per 1 $m^2$) of the insulating film is not specifically set as long as mechanical properties including abrasion resistance are sufficiently maintained. However, for example, a value of 6 g may be used as the lower limit. When the weight per unit area is less than 6 g, problems may occur during handling such as that wrinkling occurs during transportation. Therefore, it is preferable that the weight per unit area be 6 g or more.

According to an embodiment of the present invention, the easiest method for reducing the weight per unit area of a film is to reduce the thickness of the film. It is important to use a specific polyimide composition (to be described later) and set the loop stiffness value in a specific range rather than reducing the weigh simply reducing the thickness only. This allows the weight per unit area of a film to be reduced and an insulating coating material having excellent abrasion resistance to be provided.

The loop stiffness value of the insulating film according to an embodiment of the present invention is 0.45 g/cm or more. The loop stiffness value (g/cm) is a value actually measured using a loop stiffness tester, and can be measured using a loop stiffness tester manufactured by Toyo Seiki Seisaku-sho, Ltd. The loop stiffness value (g/cm) is a value obtained by reading a force when two minutes have elapsed after squashing under conditions that a sample width is 10 mm, a loop length is 50 mm, and a distance between squashings is 10 mm for the measurement. The thickness (pm) can be measured using a contact thickness gauge.

To find out a loop stiffness value of an insulating film from an insulating coating material, it is also possible that an insulating film is obtained by physically removing the adhesion layer, such as scraping a surface of the insulating coating material, and a loop stiffness value of the insulating film is measured.

The present inventors found that, conventionally, in order to evaluate abrasion resistance of an insulating coating material, it is necessary to prepare a long insulating coating material that includes an insulating film and an adhesion layer and has a width of about 6 mm and to prepare an insulated wire by winding the insulating coating material around a conducting wire; evaluation of the insulated wire is itself very complicated, and it is difficult for an evaluation result of the insulated wire to be reflected in a design of an insulating film or in an insulating coating material using the insulating film; when an abrasion property is evaluated using a laminate, which is obtained by integrating members by laminating the members and applying heat and pressure thereto such that the laminate has a structure of insulating coating material/conducting wire/insulating coating material, for a larger value of the abrasion property, an insulating coating material having a more excellent abrasion resistance can be provided. Further, the present inventors found that, when an insulating coating material is designed by focusing on properties of an insulating film, with respect to a laminate, which is obtained by integrating members by laminating the members and applying heat and pressure thereto such that the laminate has a structure of insulating film/adhesion layer/conducting wire/adhesion layer/insulating film, when an abrasion property is evaluated, and when an insulating film is used such that the value of the abrasion property is increased, the insulating coating material has excellent abrasion resistance. Conditions for producing the laminate for the abrasion property evaluation are not particularly limited. However, the heating temperature may be in a range of 280-340° C., the pressure may be in a range of 35-90 kgf/$cm^2$, and the heating time may be in a range of 5-20 minutes.

The abrasion property is evaluated according to a device and a protocol described in the British Standard Aerospace Series BS EN3475-503. As a result of measuring the abrasion property under an environment of 23° C. with respect to various insulating films using a high performance conductor nickel coated copper (AWG: 20, CONST: 19/32, diameter: 0.9 mm) manufactured by Phelps Dodge Corporation as a conducting wire and a FEP film having a thickness of 12 μm as an adhesion layer, the present inventors found that, when the abrasion property exceeds 3.0 times, the abrasion resistance can reach about 300 times; when the abrasion property exceeds 4.0 times, the abrasion resistance can reach about 400 times; and when the abrasion property exceeds 5.0 times, the abrasion resistance can reach about 500 times.

However, according to the British Standard Aerospace Series BS EN3475-503, abrasion resistance of 100 times as a required physical property is described. This standard is referenced as a guide for abrasion resistance by aircraft manufacturers. Abrasion resistance of each of many insulating coating materials that are currently actually used for civil aircrafts and the like also depends on a thickness of the material. For a thin material, an abrasion resistance of 100 times is used as a guide and the material is designed to have an abrasion resistance larger than 100 times. Therefore, even when the abrasion property increases by only 0.5 times, a significant effect in the abrasion resistance can be obtained.

For the insulating coating material, a laminate is produced using a method described in the present specification and an abrasion property is preferably 4.0 times or more. The abrasion property is more preferably 4.5 times or more, even more preferably 5.0 times or more, and particularly preferably 5.5 times or more. A value of the abrasion property is preferably as large as possible and an upper limit is not particularly set. However, for example, a value of 1000 times can be used as the upper limit.

Based on the above findings, the present inventors further advanced the study and examined what kind of an insulating film is to be used in order to provide an insulating coating material having excellent abrasion resistance, that is, an insulating coating material having a good abrasion property. As a result, the present inventors found that an insulating coating material having a loop stiffness value of 0.45 g/cm or more has excellent abrasion resistance even when weight per 1 $m^2$ is reduced. The loop stiffness value is more preferably 0.51 g/cm or more. An upper limit for the loop stiffness value is not particularly limited. However, from a point of view of suppressing spring back when the insulating coating material is wound around a conducting wire, the loop stiffness value is preferably 2.4 g/cm or less. The loop stiffness value is more preferably 2.0 g/cm or less.

To increase the loop stiffness value, a method to increase the thickness of the polyimide film can be adopted. However, the weight per unit area is increased and it may be difficult to obtain a film having a weight of 23.5 g or less per 1 $m^2$. Therefore, the polyimide film can be manufactured using specific acid dianhydride component and diamine component.

The present inventors examined various monomers used for polyimide films and found that, by including tetracarboxylic acid dianhydride having a biphenyl skeleton as a main component as an acid dianhydride component and using p-phenylenediamine as a main component as an amine component, the loop stiffness value is increased and the abrasion property is improved. That is, a polyimide film is obtained from an acid dianhydride component and a diamine component, the acid dianhydride component containing a component (a): 80-100 mol % of 2,2',3,3'-biphenyl-tetracarboxylic acid dianhydride and/or 3,3',4,4'-biphenyl-tetracarboxylic acid dianhydride in the entire acid dianhydride component, and a component (b): 0 mol %-20 mol % of other acid dianhydride components, and the diamine component containing 90 mol % or more of p-phenylenediamine in the entire diamine component.

There are various methods for increasing the loop stiffness value without changing the thickness of the polyimide film, such as selecting a composition, selecting a polymerization method, changing a drying or heating condition in a manufacturing process of the polyimide film, and changing a tensional force in a polyimide manufacturing process. The loop stiffness value can be adjusted by using each of these methods independently of using two or more of these methods in combination. However, when the component (a) and a diamine component are used, the loop stiffness value can be increased, and an obtained insulating coating material also has an excellent abrasion property.

A method for manufacturing the polyimide film is described in detail in the following.

The polyimide film is manufactured using polyamic acid as a precursor (hereinafter, the term "polyamic acid" is used synonymously with "polyimide precursor" in this specification). A method for manufacturing the polyamic acid is not particularly limited and any commonly known method can be used. For example, usually, the polyamic acid can be manufactured by dissolving an acid dianhydride component and a diamine component in substantially equimolar amounts in an organic solvent and stirring the mixture under a controlled temperature condition until polymerization of the acid dianhydride component and the diamine component is completed. The polyamic acid is usually obtained at a concentration of 5 wt % (percent by weight)-35 wt % and preferably 10 wt %-30 wt %. When the concentration is in this range, appropriate molecular weight and viscosity are obtained.

A polymerization method of the acid dianhydride component and the diamine component is not particularly limited, and any one of commonly known methods and any combination thereof can be used. One of characteristics of the polymerization method for the polymerization of the polyamic acid is an order of adding monomers, and various physical properties of resulting polyimide can be controlled by adjusting the order of adding the monomers.

The method for adding the monomers for the polymerization of the polyamic acid is not particularly limited and any method may be used. However, examples of typical polymerization methods include the following methods:

1) a method in which polymerization is performed by dissolving an aromatic diamine component in an organic polar solvent and causing it to react with a substantially equimolar amount of an aromatic tetracarboxylic acid dianhydride component;

2) a method in which an aromatic tetracarboxylic acid di anhydride component and an aromatic diamine component in a molar amount that is excessively small relative to the aromatic tetracarboxylic acid dianhydride component are caused to react in an organic polar solvent to obtain a prepolymer having acid anhydride groups at both terminals, and subsequently, polymerization is performed using the aromatic diamine component such that the aromatic tetracarboxylic acid dianhydride component and the aromatic diamine component are present in substantially equimolar amounts in the entire process;

3) a method in which an aromatic tetracarboxylic acid dianhydride component and an aromatic diamine component in a molar amount that is excessive relative to the aromatic tetracarboxylic acid dianhydride component are caused to react in an organic polar solvent to obtain a prepolymer having amino groups at both terminals, and subsequently, after adding more the aromatic diamine component to the prepolymer, polymerization is performed using the aromatic tetracarboxylic acid dianhydride component such that the aromatic tetracarboxylic acid dianhydride component and the aromatic diamine component are present in substantially equimolar amounts in the entire process;

4) a method in which an aromatic tetracarboxylic acid dianhydride component is dissolved and/or dispersed in an organic polar solvent and then polymerization is performed using an aromatic diamine component such that the aromatic tetracarboxylic acid dianhydride component and the aromatic diamine component are present in substantially equimolar amounts;

5) a method in which polymerization is performed by causing a mixture of substantially equimolar amounts of an aromatic tetracarboxylic acid dianhydride component and an aromatic diamine component to react in an organic polar solvent; and the like. These methods can each be used alone, or can be used in partial combination thereof.

As a preferable polymerization method for obtaining a polyimide resin, a method can be adopted that uses a method in which, first, a block component of a polyimide precursor is formed and thereafter a final polyimide precursor is formed using remaining diamine component and/or acid dianhydride component. In this case, it is preferable that the above methods 1)-5) be used in partial combination.

An acid dianhydride component used in embodiments of the present invention contains a component (a): 80-100 mol % of 2,2',3,3'-biphenyl-tetracarboxylic acid dianhydride and/or 3,3',4,4'-biphenyl-tetracarboxylic acid dianhydride in the entire acid dianhydride component, and a component (b): 0-20 mol % of other acid dianhydride components. Examples of the other acid dianhydride components include pyromellitic acid dianhydride, 2,3,6,7-naphthalenetetracarboxylic acid dianhydride, 3,3',4,4'-benzophenonetetracarboxylic acid dianhydride, 2,2-bis(3,4-dicarboxyphenyl) propanoic acid dianhydride, p-phenylene bis(trimellitic acid monoester acid anhydride), 4,4'-oxydiphthalic acid dianhydride, and the like. These can each be used alone or can be used in combination of two or more thereof. As the other acid dianhydride components, pyromellitic acid dianhydride and 3,3',4,4'-benzophenonetetracarboxylic acid dianhydride are preferably used from a point of view that the loop stiffness value of a finally obtained polyimide film can be easily adjusted, and 3,3',4,4'-benzophenone tetracarboxylic acid dianhydride is particularly preferably used.

A preferred acid dianhydride component used in embodiments of the present invention contains 80 mol %-95 mol % of the component (a) and 5 mol %-20 mol % of the component (b). Further, when 80 mol %-95 mol % of the component (a) is contained and 5-20 mol % of 3,3',4,4'-benzophenone tetracarboxylic acid dianhydride as the component (b) is contained, even when the thickness of the film is small, the film has an abrasion property. When coupled with adjusting the loop stiffness value to the above-described range, the weight per unit area of the film can be reduced, and the abrasion property of a resulting insulating coating material can be improved. In this case, the diamine component (to be described later) to be used in combination preferably contains 95 mol %-100 mol % of p-phenylenediamine, and more preferably contains 100 mol %, of p-phenylenediamine.

Another preferred acid dianhydride component used in embodiments of the present invention contains 95 mol %-100 mol % of the component (a) and 0 mol %-5 mol % of the component (b), and more preferably contains 100% of the component (a). In this case, the diamine component (to be described later) to be used in combination preferably contains 95 mol %-100 mol % of p-phenylenediamine, and more preferably contains 100 mol %, of p-phenylenediamine.

A diamine component used in embodiments of the present invention contains 90 mol % or more of p-phenylenediamine in the entire diamine component. Example of diamine components other than p-phenylenediamine include 4,4'-diaminodiphenylpropane, 4,4'-diaminodiphenylmethane, 4,4'-diaminodiphenyl sulfide, 3,3'-diaminodiphenyl sulfone, 4,4'-diaminodiphenyl sulfone, 4,4'-oxydianiline, 3,3'-oxydianiline, 3,4'-oxydianiline, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, bis{4-(4-aminophenoxy) phenyl}sulfone, bis{4-(3-aminophenoxy) phenyl}sulfone, 4,4'-bis(4-aminophenoxy) biphenyl, 4,4'-bis(3-aminophenoxy) biphenyl, 1,3-bis(3-aminophenoxy) benzene, 1,3-bis(4-aminophenoxy) benzene, 1,4-bis(4-aminophenoxy) benzene, 1,3-bis(3-aminophenoxy) benzene, 3,3'-diaminobenzophenone, 4,4'-diaminobenzophenone, 2,2'-dimethyl-4,4'-diaminobiphenyl, 2,2-bis (4-aminophenoxyphenyl) propane, 3,3'-dihydroxy-4,4'-diamino-1,1'-biphenyl and the like. These can each be used alone or can be used in combination of two or more thereof. Further, in addition to the above diamine components, any diamine component can be used as an accessory component. Among these, examples of a diamine component that can be particularly preferably used include 4,4'-oxydianiline, 1,3-bis(4-aminophenoxy) benzene, 3,4'-oxydianiline, and 2,2-bis[4-(4-aminophenoxy) phenyl] propane.

A preferred solvent for synthesizing the polyamic acid is not particularly limited, and any solvent capable of dissolving the polyamic acid can be used. For example, amide-based solvents, that is, N,N-dimethylformamide (DMF), N,N-dimethylacetamide, N-methyl-2-pyrrolidone and the like, can be adopted. Among these, N,N-dimethylformamide and N,N-dimethylacetamide can be particularly preferably used.

Further, a filler can be added to the polyimide film for a purpose of improving various properties of the film such as slidability, thermal conductivity, electrical conductivity, corona resistance, loop stiffness and the like. Any filler may be used. However, preferred examples thereof include silica, titanium oxide, alumina, silicon nitride, boron nitride, calcium hydrogen phosphate, calcium phosphate, mica and the like.

A method for manufacturing the polyimide film from a polyamic acid solution is not particularly limited, and various methods can be used. For example, a thermal imidization method and a chemical imidization method can be adopted, and a film can be manufactured using any one of the methods.

Further, it is preferable that processes for manufacturing a particularly preferred polyimide film include:

i) a process of obtaining a polyamic acid solution by causing an aromatic diamine component and an aromatic tetracarboxylic acid dianhydride component to react in an organic solvent;

ii) a process of casting a film-forming dope containing the polyamic acid solution on a support;

iii) a process of heating the film-forming dope on the support and thereafter peeling off a gel film from the support; and iv) a process of further heating the gel film to imidize remaining amic acid and to dry the film.

In the above processes, a curing agent may be used that includes a dehydrating agent represented by an acid anhydride such as acetic anhydride, and an imidization catalyst represented by tertiary amines such as isoquinoline, quinoline, β-picoline, pyridine, diethylpyridine, and the like. Further, the dehydrating agent and the imidization catalyst can each be used alone.

From a point of view of durability characteristics and other required characteristics, hydrolysis resistance may be required together with the abrasion resistance for the insulating film. The hydrolysis resistance, for example, can be evaluated using tear strength retention rates before and after a PCT test (pressure cooker test). Tear strength can be evaluated before and after a PCT test according to ASTM D-1938. For example, a PCT test was conducted for 96 hours under conditions of 150° C., 100% RH, 0.4 MPa. A value obtained by dividing tearing strength after a PCT test by tearing strength before the PCT test can be used as a tear strength PCT retention rate.

<2. Adhesion Layer>

An adhesion layer that can be used for the insulating coating material according to an embodiment of the present invention is not particularly limited, and various adhesion layers can be used. For example, any material may be used as long as the material can bond an insulating film to a conductor of an electric wire or a conducting wire such as a cable (wire). However, it is preferable that a thermoplastic resin be used. Among thermoplastic resins, from a point of view of an insulating property, chemical resistance and the like, it is preferable that a fluorine resin be used.

As the fluorine resin, for example, a tetrafluoroethylene polymer, a tetrafluoroethylene-hexafluoropropylene copolymer, a tetrafluoroethylene-perfluoro (alkyl vinyl ether) copolymer, a tetrafluoroethylene-ethylene copolymer, polychlorotrifluoroethylene, an ethylene-chlorotrifluoroethylene copolymer, polyvinylidene fluoride, a vinylidene fluoride-hexafluoropropylene copolymer, polyvinyl fluoride and the like can each be used alone or can be used in combination of two or more thereof. Among these, from a point of view of having a low melting point and allowing pressure bonding to be performed at a relatively low temperature and allowing a laminate to be easily and reliably obtained, it is preferable that the tetrafluoroethylene polymer or the tetrafluoroethylene-perfluoro (alkyl vinyl ether) copolymer be used.

A thickness of the adhesion layer is not particularly limited as long as adhesiveness is developed. However, it is preferable that the thickness of the adhesion layer be 0.5-13 μm.

At least one adhesion layer is formed on the insulating film. That is, the insulating coating material may have a two-layer structure. Further, it is also possible that the adhesion layer is formed on both surfaces of the insulating film. That is, the insulating coating material may have a three-layer structure. Further, it is also possible that multiple adhesion layers are formed on one side of the insulating film. Further, it is also possible that one adhesion layer is formed on one side of the insulating film and multiple adhesion layers are formed on the other side of the insulating film. Further, it is also possible that multiple adhesion layers are formed on both sides of the insulating film. That is, for example, the insulating coating material can be manufactured by covering one side or both sides of an insulating film such as polyimide film that functions as a base layer with an adhesion layer containing a fluorine resin.

It is preferable that the insulating coating material have a three-layer structure of adhesion layer/insulating film/adhesion layer. Further, it is preferable that the insulating film be formed of polyimide and the adhesion layer be formed of a fluorine resin.

<3. Manufacture of Insulating Coating Material>

A method for manufacturing an insulating coating material according to an embodiment of the present invention is described. The insulating coating material is obtained by laminating an adhesion layer on both sides or on one side of an insulating film and by heating and firing after laminating such an adhesion layer. The laminate of the insulating film and the adhesion layer can be manufactured by a person skilled in the art using any commonly known method. However, for example, the laminate can be usually obtained using a method in which a film-like adhesion layer is laminated on an insulating film or a method in which a resin dispersion of an adhesion layer is applied to an insulating film. For example, when the adhesion layer is formed of a fluorine resin, as the dispersion, for example, a dispersion obtained by dispersing a tetrafluoroethylene-hexafluoropropylene copolymer (FEP), a tetrafluoroethylene-perfluoro (alkyl vinyl ether) copolymer (PFA), and polytetrafluoroethylene (PTFE) in water or in an organic solvent can be used. Specifically, when applying the dispersion, a dispersion of the fluorine-based resin is prepared. A solid state component concentration of the dispersion used here is not particularly limited. However, a solid state component concentration of 10 wt %-70 wt % is preferable in terms of handling. Typical examples of the film in the case of laminating include films of a tetrafluoroethylene-hexafluoropropylene copolymer, polytetrafluoroethylene, a tetrafluoroethylene-perfluoro (alkyl vinyl ether) copolymer, a tetrafluoroethylene-ethylene copolymer, polychlorotrifluoroethylene containing chlorine, and the like.

An inorganic or organic filler or the like may be added to the dispersion or the film using a commonly known method. Further, a surface of the fluorine resin or a bonding surface of the fluorine resin to the polyimide film may be subjected to a commonly known surface treatment such as a corona discharge treatment or a plasma discharge treatment.

The insulating coating material thus obtained is wound on a conducting wire, and the resulting wire is used as an insulated cable or an insulated wire.

<4. Use of Insulating Coating Material>

Embodiments of the present invention can include an insulated cable or an insulated wire having the above insulating coating material. Such an insulated cable or insulated wire, for example, can be suitably used for a conducting wire such as an electric wire, or a cable (or wire), for aerospace applications such as aircrafts.

The conducting wire such as an electric wire or a cable (wire) can use any material as long as the material is a conductor. However, a metal is usually used. Examples of the metal include copper, aluminum, stainless steel and the like. Although copper is preferred, aluminum is also preferred from the point of view of weight reduction. Further, these metals may be various alloys, and their surfaces may be plated with various materials. A diameter of the conducting wire is not particularly limited. However, since a diameter of a conducting wire that is currently mainly used in the market is about 0.9 mm, it is preferable to use a conducting wire of 0.9 mm in diameter in order to obtain a more accurate value.

A method for manufacturing the insulated cable is not particularly limited, and various methods can be used. As an example, the insulated cable can be manufactured by forming the insulating coating material into a tape (long object) and spirally winding such a tape of the insulating coating material around a conductor (such as a metal). Further, it is also possible that, after the tape of the insulating coating material is wound around the conductor once, a tape of another insulating coating material is further wound around the conductor in an overlapping manner.

When a tape of the insulating coating material is wound around a conductor, a tensional force applied to the tape can be widely varied from a tensional force enough to avoid occurrence of wrinkling to a range of a tensional force strong enough to pull the tape to cause neck down to occur. Even when the tensional force is small, due to an influence of heat (for example, heating to 240° C.-500° C.) in a heat sealing process that is performed after the winding, the tape shrinks and thus, the conductor is covered with good adhesion by the insulating coating material. The heat sealing process can be appropriately set according to the thickness of the insulating film, the thickness of the adhesion layer, the material of the conductor, a speed of a production line, a length of a seal oven, and the like. Further, the winding of the insulating coating material on the conductor can also be performed using a standard electric wire coating machine (wrapping machine) or the like.

The present invention has the following aspects.

1) A insulating coating material has an adhesion layer on at least one side of a polyimide film. The polyimide film has a weight of 23.5 g or less per 1 $m^2$ and a loop stiffness value of 0.45 g/cm or more.

2) The insulating coating material described in the above aspect 1) is obtained by polymerizing an acid dianhydride component and a diamine component, the acid dianhydride component containing a component (a): 80-100 mol % of 2,2',3,3'-biphenyl-tetracarboxylic acid dianhydride and/or 3,3',4,4'-biphenyl-tetracarboxylic acid dianhydride in the entire acid dianhydride component, and a component (b): 0 mol %-20 mol % of other acid dianhydride components, and the diamine component containing 90 mol % or more of p-phenylenediamine in the entire diamine component.

3) The insulating coating material described in the above aspect 2) includes 80 mol %-95 mol % of the component (a) in the entire acid dianhydride component, and 5 mol %-20 mol % of the component (b) in the acid dianhydride component.

4) The insulating coating material described in any one of the above aspects 2) and 3) contains 3,3',4,4'-benzophenone tetracarboxylic acid dianhydride as the component (b).

5) The insulating coating material described in the above aspect 2) contains 100 mol % of the component (a) in the entire acid dianhydride component.

6) In the insulating coating material described in any one of the above aspects 2)-5), the component (a) is 3,3',4,4'-biphenyl-tetracarboxylic acid dianhydride.

7) In the insulating coating material described in any one of the above aspects 5) and 6), 100 mol % of the diamine component is formed from p-phenylenediamine.

8) The insulating coating material described in any one of the above aspects 1)-7) has a three-layer structure of adhesion layer/polyimide film/adhesion layer.

9) In the insulating coating material described in any one of the above aspects 1)-8), the adhesion layer is formed from a fluorine resin.

10) An insulated cable or insulated wire covered by the insulating coating material described in any one of the above aspects 1)-9).

EXAMPLES

In the following, based on Examples and Comparative Examples, the present invention is further specifically described. The present invention is not limited to the following Examples.

(Calculation of Weight per 1 $m^2$ of Insulating Film)

A film having a size of 0.5 m×0.5 m was left alone for 24 hours in an environment of 23° C. and 55% RH, and weight measurement was performed to obtain a weight per 0.25 $m^2$. The obtained value was multiplied by 4 to obtain a weight per 1 $m^2$. The measurement was performed under an environment of 23° C. and 55% RH.

(Loop Stiffness and Thickness Measurement of Insulating Film)

Measurement was performed using a loop stiffness tester manufactured by Toyo Seiki Seisaku-sho, Ltd., under conditions that a sample width was 10 mm, a loop length was 50 mm, and a distance between squashings was 10 mm. A force when 2 minutes had passed after squashing was read. The measurement was performed three times for each sample, and an average value thereof was used as the loop stiffness value. With respect to an arbitrary place of a film included in the loop length, thickness measurement was performed at five points at substantially equal intervals in a longitudinal direction in a substantially central portion using a contact thickness gauge (MT12 manufactured by Heidenhain), and an average value thereof was used as the film thickness. The measurement was performed under an environment of 23° C. and 55% RH.

(Sample Preparation for Abrasion Property Evaluation)

A sample for evaluation was obtained by laminating members so as to obtain a laminate having a structure of insulating film/adhesion layer/0.9 mmφ conducting wire/adhesion layer/insulating film and then laminating members so as to form a structure of SUS plate/cushioning material/the above-described laminate/cushioning material/SUS plate, and applying a pressure of 80 kgf/$cm^2$ to the structure at 293° C. for 10 minutes. For the pressure bonding, a compression molding machine (SFA-50 type) manufactured by Shinto Metal Industries Corporation was used. For the conducting wire, a high performance conductor nickel coated copper (AWG: 20, CONST: 19/32, diameter: 0.9 mm) manufactured by Phelps Dodge Corporation was used. For the adhesion layer, a tetrafluoroethylene-hexafluoropropylene copolymer (FEP) film having a thickness of 12 μm was used. For the cushioning material, a Kinyo board manufactured by Kinyosha Co., Ltd. was used. The conducting wire was about 30 cm in length; the insulating film was cut into 4 cm×25 cm; and the FEP film was cut into 3 cm×23 cm. The SUS plate had a thickness of 3 mm and was mirror finished.

(Measurement of Abrasion Property)

The abrasion property of the obtained sample for abrasion property evaluation was measured according to the British Standard Aerospace Series BS EN3475-503. The measurement was performed 5 times, and an average value thereof was used as the abrasion property. For the measurement, the Repeated Scrape Abrasion Tester (Cat 158L238G1) manufactured by WELLMAN Co., Ltd. was used. The measurement was performed under an environment of 23° C. and 55% RH.

(Evaluation of Hydrolysis Resistance)

The hydrolysis resistance was evaluated using tear strength retention rates before and after a PCT test (pressure cooker test). The tear strength was measured at a temperature of 23° C. before and after a PCT processing according to ASTM D-1938. The measurement was performed three times for each sample, and an average value thereof was used as the tear strength. The PCT processing was performed for 96 hours under conditions of 150° C., 100% RH, 0.4 MPa. A value obtained by dividing the tearing strength after the PCT by the tearing strength before the PCT was used as a tear strength PCT retention rate (%).

Synthesis Example 1

Synthesis of Polyimide Precursor 1

868.2 kg of DMF was charged into a kettle having a capacity of 1900 L; 45.6 kg of p-phenylenediamine (PDA) was added; 115.0 kg of 3,3',4,4'-biphenyl-tetracarboxylic acid dianhydride (BPDA) was added; 9.8 kg of 3,3',4,4'-benzophenonetetracarboxylic acid dianhydride (BTDA) was added; and the mixture was stirred for 2 hours to dissolve. A separately prepared DMF solution (7 wt %) of BTDA was gradually added to the above reaction solution until viscosity at 23° C. reached 2500 poise, and thus a polyimide precursor 1 was obtained.

Synthesis Example 2

Synthesis of Polyimide Precursor 2

905.2 kg of DMF was charged into a kettle having a capacity of 1900 L; 128.7 kg of 3,3',4,4'-biphenyl-tetracarboxylic acid dianhydride (BPDA) was added; 37.8 kg of p-phenylenediamine (PDA) was added; and the mixture was stirred for 2 hours to dissolve. Further, 8.0 kg of p-phenylenediamine (PDA) was added, and the mixture was stirred for one hour to dissolve. A separately prepared DMF solution (7 wt %) of PDA was gradually added to the above reaction solution until viscosity at 23° C. reached 2500 poise, and thus a polyimide precursor 2 was obtained.

Synthesis Example 3

Synthesis of Polyimide Precursor 3

885.4 kg of DMF was charged into a kettle having a capacity of 1900 L; 8.9 g of 4,4'-oxydianiline (ODA) was added; 43.2 kg of p-phenylenediamine (PDA) was added; 104.5 kg of 3,3',4,4'-biphenyl-tetracarboxylic acid dianhydride (BPDA) was added; 16.5 kg of pyromellitic acid dianhydride (PMDA) was added; and the mixture was stirred for 1 hour to dissolve. A separately prepared DMF solution (7 wt %) of PMDA was gradually added to the above reaction solution until viscosity at 23° C. reached 2500 poise, and thus a polyimide precursor 3 was obtained.

Synthesis Example 4

Synthesis of Polyimide Precursor 4

885.1 kg of DMF was charged into a kettle having a capacity of 1900 L; 35.8 kg of 4,4'-oxydianiline (ODA) was added; 29.0 kg of p-phenylenediamine (PDA) was added; 52.6 kg of 3,3',4,4'-biphenyl-tetracarboxylic acid dianhydride (BPDA) was added; 55.6 kg of pyromellitic acid dianhydride (PMDA) was added; and the mixture was stirred for 1 hour to dissolve. A separately prepared DMF solution (7 wt %) of PMDA was gradually added to the above reaction solution until viscosity at 23° C. reached 2500 poise, and thus a polyimide precursor 4 was obtained.

Synthesis Example 5

Synthesis of Polyimide Precursor 5

888.0 kg of DMF was charged into a kettle having a capacity of 1900 L; 25.5 kg of 2,2-bis-[4-(4-aminophenoxy)phenyl]propane (BAPP) was added; 29.0 kg of 4,4'-oxydianiline (ODA) was added; 26.7 kg of 3,3',4,4'-benzophenonetetracarboxylic acid dianhydride (BTDA) was added; 22.6 kg of pyromellitic acid dianhydride (PMDA) was added; and the mixture was stirred for 50 minutes to dissolve. Here, 22.4 kg of p-phenylenediamine (PDA) was added; 47.0 kg of pyromellitic acid dianhydride (PMDA) was added; and the mixture was stirred for 1 hour to dissolve. A separately prepared DMF solution (7 wt %) of PMDA was gradually added to the above reaction solution until viscosity at 23° C. reached 2500 poise, and thus a polyimide precursor 5 was obtained.

Synthesis Example 6

Synthesis of Polyimide Precursor 6

860.9 kg of DMF was charged into a kettle having a capacity of 1900 L; 94.8 kg of 4,4'-oxydianiline (ODA) was added; 100.1 kg of pyromellitic acid dianhydride (PMDA) was added; and the mixture was stirred for 1 hour to dissolve. A separately prepared DMF solution (7 wt %) of PMDA was gradually added to the above reaction solution until viscosity at 23° C. reached 2500 poise, and thus a polyimide precursor 6 was obtained.

Example 1

The polyimide precursor 1 obtained in Synthesis Example 1 contained the following chemical dehydrating agent and catalyst and DMF.

Chemical dehydrating agent: 2.6 mol of acetic anhydride per 1 mol of an amic acid unit of the polyamic acid of the polyimide precursor Catalyst: 0.6 mol of isoquinoline per 1 mol of an amic acid unit of the polyamic acid of the polyimide precursor DMF: In a weight such that a total weight of the chemical dehydrating agent and the catalyst and the DMF is 45% of a weight of the polyimide precursor The polyimide precursor 1 was applied by casting on a aluminum foil having a thickness of 30 µm using a comma coater and a thickness gauge (0.013 inch). This resin film was heated at 125° C. for 110 seconds. Thereafter a self-supporting gel film was peeled off from the aluminum foil and was fixed to a metal frame, and was dried and imidized at 250° C. for 14 seconds, at 350° C. for 14 seconds, and at 450° C. for 120 seconds, and a film having a weight of 21.7 g per 1 $m^2$ was obtained. With respect to the obtained film, loop stiffness measurement was performed. A sample for abrasion measurement was prepared using the remaining film and abrasion property measurement was performed. Further, hydrolysis resistance evaluation was performed by PCT test. The results are shown in Table 1.

Example 2

A polyimide film was obtained in the same manner as in Example 1 except that a thickness gauge of 0.014 inch was used. The obtained film had a weight of 23.3 g per 1 $m^2$. With respect to the obtained film, loop stiffness measurement was performed. A sample for abrasion measurement was prepared using the remaining film and abrasion property measurement was performed. The results are shown in Table 1.

Example 3

A polyimide film was obtained in the same manner as in Example 1 except that the polyimide precursor 2 obtained in Synthesis Example 2 was used. The obtained film had a weight of 22.3 g per 1 $m^2$. With respect to the obtained film, loop stiffness measurement was performed. A sample for abrasion measurement was prepared using the remaining film and abrasion property measurement was performed. The results are shown in Table 1.

Example 4

A polyimide film was obtained in the same manner as in Example 1 except that the polyimide precursor 3 obtained in Synthesis Example 3 was used. The obtained film had a weight of 21.6 g per 1 m². With respect to the obtained film, loop stiffness measurement was performed. A sample for abrasion measurement was prepared using the remaining film and abrasion property measurement was performed. The results are shown in Table 1.

Comparative Example 1

A polyimide film was obtained in the same manner as in Example 1 except that the polyimide precursor 4 obtained in Synthesis Example 4 was used. The obtained film had a weight of 21.6 g per 1 m². With respect to the obtained film, loop stiffness measurement was performed. A sample for abrasion measurement was prepared using the remaining film and abrasion property measurement was performed. The results are shown in Table 1.

Comparative Example 2

The polyimide precursor 5 obtained in Synthesis Example 5 contained the following chemical dehydrating agent and catalyst and DMF.

Chemical dehydrating agent: 2.1 mol of acetic anhydride per 1 mol of an amic acid unit of the polyamic acid of the polyimide precursor Catalyst: 0.8 mol of isoquinoline per 1 mol of an amic acid unit of the polyamic acid of the polyimide precursor DMF: In a weight such that a total weight of the chemical dehydrating agent and the catalyst and the DMF is 50% of a weight of the polyimide precursor Comparative Example 3

A polyimide film was obtained in the same manner as in Comparative Example 2 except that the polyimide precursor 6 obtained in Synthesis Example 6 was used and a thickness gauge (0.014 inch) was used. The obtained film had a weight of 23.0 g per 1 m². With respect to the obtained film, loop stiffness measurement was performed. A sample for abrasion measurement was prepared using the remaining film and abrasion property measurement was performed. The results are shown in Table 1.

Comparative Example 4

A polyimide film was obtained in the same manner as in Comparative Example 3 except that a thickness gauge (0.021 inch) was used. The obtained film had a weight of 30.2 g per 1 m². With respect to the obtained film, loop stiffness measurement was performed. A sample for abrasion measurement was prepared using the remaining film and abrasion property measurement was performed. The results are shown in Table 1.

Comparative Example 5

With respect to a polyimide film Apical AV (US product name (expressed as "Apical AH" in Japan)) manufactured by Kaneka Corporation, measurement of weight per 1 m² and loop stiffness measurement were performed. Further, a sample for abrasion measurement was prepared and abrasion property measurement was performed. Further, hydrolysis resistance evaluation was performed by PCT test. The results are shown in Table 1.

TABLE 1

| Example/ Comparative Example | Formulation | Molar Ratio | | | | | | Weight of Polyimide Film per 1 m² g | Loop Stiffness Value of Polyimide Film g/cm | Abrasion Property times | Hydrolysis Resistance (Tear Strength PCT Retention Rate) % |
|---|---|---|---|---|---|---|---|---|---|---|---|
| | | Diamine | | | Acid Dianhydride | | | | | | |
| | | ODA mol % | PDA mol % | BAPP mol % | PMDA mol % | BTDA mol % | BPDA mol % | | | | |
| Example 1 | Synthesis Example 1 | 0 | 100 | 0 | 0 | 10 | 90 | 21.7 | 0.515 | 7.0 | 97 |
| Example 2 | Synthesis Example 1 | 0 | 100 | 0 | 0 | 10 | 90 | 23.3 | 0.631 | 8.5 | — |
| Example 3 | Synthesis Example 2 | 0 | 100 | 0 | 0 | 0 | 100 | 22.3 | 0.540 | 6.4 | — |
| Example 4 | Synthesis Example 3 | 10 | 90 | 0 | 20 | 0 | 80 | 21.6 | 0.460 | 6.0 | 91 |
| Comparative Example 1 | Synthesis Example 4 | 40 | 60 | 0 | 60 | 0 | 40 | 21.6 | 0.320 | 2.0 | — |
| Comparative Example 2 | Synthesis Example 5 | 35 | 50 | 15 | 80 | 20 | 0 | 24.2 | 0.498 | 3.8 | — |
| Comparative Example 3 | Synthesis Example 6 | 100 | 0 | 0 | 100 | 0 | 0 | 23.0 | 0.233 | 1.3 | — |
| Comparative Example 4 | Synthesis Example 6 | 100 | 0 | 0 | 100 | 0 | 0 | 30.2 | 0.528 | 2.2 | — |
| Comparative Example 5 | Apical AV | — | — | — | — | — | — | 26.6 | 0.361 | 1.7 | 23 |

The polyimide precursor 5 was molded into a film shape using a comma coater and a thickness gauge (0.015 inch), and a film having a weight of 24.2 g per 1 m² was obtained. With respect to the obtained film, loop stiffness measurement was performed. A sample for abrasion measurement was prepared using the remaining film and abrasion property measurement was performed. The results are shown in Table 1.

Among the durability characteristics that are desired for an insulating coating material, an important property is abrasion resistance. In particular, from a point of view of safety assurance, for an insulating coating material used for electric wires and cables for aerospace applications, it is preferable that the abrasion resistance be as high as possible. For example, the insulating coating material is required to be a material capable of withstanding friction when the electric wires and cables are installed in an aircraft and friction generated by vibration during flight. Therefore, the abrasion resistance is regarded as important for aerospace applications.

Further, from a point of view of being environmentally conscious, in order to improve fuel economy, lightweight is required for an insulating coating material used for conducting wires such as electric wires and cables for aerospace applications such as aircrafts. For example, a length of all electric wires used in a typical passenger aircraft (number of seats: about 300) amounts to a considerable length of about 200 km per one aircraft. Therefore, reducing the weight of a coating material for the electric wires contributes to overall weight reduction, and improvement in fuel economy is expected. The weight of a coating material used in currently used aircrafts is approximately about 120 kg per one aircraft. Therefore, it is desirable to reduce the weight of the coating material by even 1 kg.

A method to improve abrasion resistance is to increase the thickness of the insulating coating material. However, this is not necessarily a preferred method since it is contrary to "lightweight," the above-described basic requirement. On the other hand, reducing the thickness of the insulating coating material is a useful method for realizing weight reduction. However, mechanical properties such as abrasion resistance are degraded. Degradation of mechanical properties poses a threat to safety and thus is not preferable. A material that allows both "lightweight" from a point of view of being environmentally conscious and "quality improvement" for more reliably ensuring safety to be achieved has been demanded.

The above problem can be solved by the following new insulating coating material and insulated cables or insulated wires for which the insulating coating material is used.

1) An insulating coating material has an adhesion layer on at least one side of a polyimide film. The polyimide film has a weight of 23.5 g or less per 1 m² and a loop stiffness value of 0.45 g/cm or more.

The insulating coating material according to an embodiment of the present invention can achieve the effect of providing the material that is more lightweight and more excellent in abrasion resistance as compared to an insulating coating material that is conventionally used in the aircraft industry. Therefore, the insulating coating material is useful, for example, for developing electric wires and cables and the like for aerospace applications.

INDUSTRIAL APPLICABILITY

The insulating coating material according to an embodiment the present invention has excellent abrasion resistance and thus is useful, for example, for electric wires and cables for aerospace applications, and can also be used in various industrial fields.

Obviously, numerous modifications and variations of the present invention are possible in light of the above teachings. It is therefore to be understood that within the scope of the appended claims, the invention may be practiced otherwise than as specifically described herein.

What is claimed is:

1. An insulating coating material, comprising:
a polyimide film; and
at least one adhesion layer on at least one side of the polyimide film,
wherein the polyimide film has a weight of 23.5 g or less per 1 m² and a loop stiffness value of 0.45 g/cm or more,
wherein the polyimide film comprises a polymer of an acid dianhydride component and a diamine component, and
wherein the acid dianhydride component comprises:
a component (a) comprising from 80 mol % to 95 mol % 3,3',4,4'-biphenyl-tetracarboxylic acid dianhydride (BPDA), with respect to a total of the acid dianhydride component, and
a component (b) comprising from 5 mol % to 20 mol % of 3,3',4,4'-benzophenonetetracarboxylic acid dianhydride (BTDA), with respect to the total of the acid dianhydride component,
wherein the diamine component comprises 90 mol % or more of p-phenylenediamine with respect to a total of the diamine component, and
wherein the insulating coating material has an abrasion property of at least 4.0 times as determined by the British Standard Aerospace Series BS EN3475-503.

2. The insulating coating material of claim 1, wherein 100 mol % of the diamine component is p-phenylenediamine.

3. The insulating coating material of claim 2, wherein the at least one adhesion layer is provided in plurality, and the adhesion layers are formed on both sides of the polyimide film such that the insulating coating material has a three-layer structure.

4. The insulating coating material of claim 3, wherein the at least one adhesion layer comprises a fluorine resin.

5. The insulating coating material of claim 1, wherein the at least one adhesion layer is provided in plurality, and the adhesion layers are formed on both sides of the polyimide film such that the insulating coating material has a three-layer structure.

6. The insulating coating material of claim 1, wherein the at least one adhesion layer comprises a fluorine resin.

7. An insulated cable or insulated wire, comprising:
a cable; and
the insulating coating material of claim 1 covering the cable.

8. The insulating coating material of claim 1, wherein the weight of the polyimide film is 22.5 g or less per 1 m².

9. The insulating coating material of claim 1, wherein the weight of the polyimide film is 21.7 g or less per 1 m².

10. The insulating coating material of claim 1, wherein the weight of the polyimide film is from 6 g to 23.5 g per 1 m².

11. The insulating coating material of claim 1, wherein the loop stiffness value is 0.51 g/cm or more.

12. The insulating coating material of claim 1, wherein the loop stiffness value is from 0.45 g/cm to 2.4 g/cm.

13. The insulating coating material of claim 1, wherein the loop stiffness value is from 0.45 g/cm to 2.0 g/cm.

* * * * *